United States Patent [19]
Kato et al.

[11] Patent Number: 5,868,844
[45] Date of Patent: Feb. 9, 1999

[54] SELF-ADHESIVE PART OF HOOK AND LOOP FASTENER AND AN APPARATUS FOR FORMING THE SAME

[75] Inventors: Hisanori Kato, Frankfurt; Klaus Steinmetz, Halver, both of Germany

[73] Assignee: YKK Corporation, Tokyo, Japan

[21] Appl. No.: 683,858

[22] Filed: Jul. 19, 1996

[30] Foreign Application Priority Data

Jul. 21, 1995 [GB] United Kingdom .................... 9514987

[51] Int. Cl.$^6$ ................................................ B05B 13/00
[52] U.S. Cl. ............................ 118/642; 118/58; 118/67; 118/68; 118/69; 118/314; 118/325; 156/72; 156/435; 156/498; 156/499; 156/578; 427/207.1; 427/208.8; 427/381; 427/388.4; 427/394; 427/412; 427/421; 427/424
[58] Field of Search ............................... 118/642, 58, 67, 118/68, 69, 314, 325; 427/207.1, 208.8, 381, 394, 412, 388.4, 421, 424; 156/72, 435, 322, 578, 498, 499

[56] References Cited

U.S. PATENT DOCUMENTS

| | | | |
|---|---|---|---|
| 2,961,342 | 11/1960 | Snyder | 427/381 |
| 3,537,946 | 11/1970 | Traux et al. | 156/72 |
| 3,764,448 | 10/1973 | Nisbet et al. | 156/72 |
| 3,806,385 | 4/1974 | Terry | 156/72 |
| 4,034,134 | 7/1977 | Gregorian et al. | 156/72 |
| 4,171,395 | 10/1979 | Tillotson | 156/72 |
| 4,587,141 | 5/1986 | Cooley | 427/394 |
| 4,668,540 | 5/1987 | Long et al. | 427/381 |
| 5,106,656 | 4/1992 | Nakaoka et al. | 427/394 |

FOREIGN PATENT DOCUMENTS 2 134 007 A  11/1984  United Kingdom .

OTHER PUBLICATIONS

Edward D. Cohen et al, *Modern Coating and Drying Technology*, pp. 6–11, 1992.

*Primary Examiner*—Laura Edwards
*Attorney, Agent, or Firm*—Hill & Simpson

[57] ABSTRACT

A self-adhesive part of a hook and loop fastener has a multiplicity of layers of pressure-sensitive adhesive on a back surface of the base material, for adhering the part to a mating substrate. The adhesive is water based and a plurality times of coating and drying processes are repeated so as to have successive coatings. This reduces the overall drying time and efficiency is secured and minimization of required space can be realized without impairing adhesive function.

10 Claims, 2 Drawing Sheets

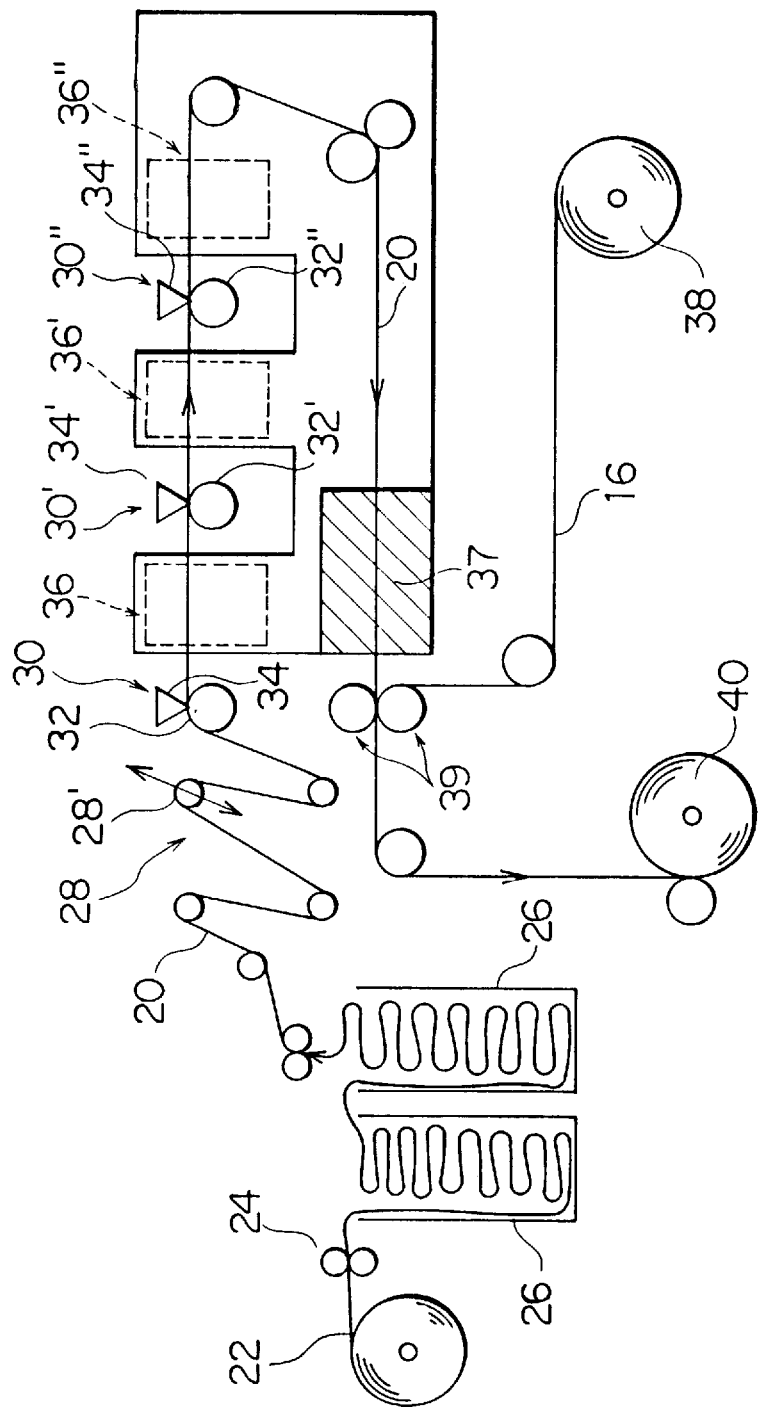

SELF-ADHESIVE PART OF HOOK AND LOOP FASTENER AND AN APPARATUS FOR FORMING THE SAME

BACKGROUND OF THE INVENTION

1. Field of the Invention

The present invention relates to a self-adhesive part of a hook and loop fastener and a method for forming the same and to an apparatus for forming adhesive layers thereon, and more specifically to a adhesive part structure in which at least a pressure-sensitive adhesive layer is formed so as to adhere said part to a base sheet, and a forming method and apparatus thereof.

2. Description of the Related Art

Existing hook and loop fasteners of this type use a hot melt adhesive. The hot melt adhesives are adversely affected by temperature variations and/or do not provide sufficient strength in some applications. On the other hand, organic solvent based adhesives pose environmental problems.

Thus, a preferable type of adhesive is water based adhesives which dissolves or disperses in water. This is because they are environmentally friendly and in the case of some kind of forumulations a high temperature resistance, up to 160° C. can be provided.

However, the advantages of the water based adhesives are offset by the production difficulties.

The fastener part is manufactured as a long roll with the hooks or loops formed on a flexible polymer base material, as is well known in the art. If the water based adhesive is applied to the back surface of the base material in a continuous process, the coated material must be run through a long path to give the adhesive sufficient time to dry. Attempts at speeding up the drying process impair the performance of the adhesive.

SUMMARY OF THE INVENTION

Therefore, an object of the invention is to provide, in a hook and loop fastener having a pressure sensitive adhesive layer on a back surface of a base material thereof, a self-adhesive part structure which enables efficient drying of the adhesive layer in a short distance of travelling path so as to realize high productivity, and also to provide a method for forming the self-adhesive part and an apparatus for forming the adhesive layer.

The above object can be realized by applying a water based adhesive in a plurality of layers.

That is to say, in the structure of the foregoing self-adhesive part, the back surface of the base material has a plurality of layers of the same kind of adhesives. And in the forming method, the adhesive is a water based adhesive, which is applied on the back surface of the base material in the plurality of layers, and each time the adhesive is applied, the adhesive is dried to form a successive layers. Preferably, the adhesive is applied in three or more layers.

Unexpectedly, it has been found that the required overall drying time is reduced when the adhesive is applied in a plurality of layers. This is presumably because when a required amount of water based adhesive is applied and dried at one time, it takes much longer time to get rid of water inside the adhesive than the time required for drying its surface portion. And there is no adverse affect on the bonding of the adhesive to the base material, and the performance of the adhesive layer is not impaired.

The invention also provides an apparatus for forming a water based adhesive layer on a base material of a part of a hook and loop fastener, the apparatus at least comprising, a first coating station for applying a first layer of the adhesive to the back surface of the base material, a first drying station for drying the adhesive, a second coating station for applying a second layer of the same adhesive to cover the first, dried layer, and a second drying station for drying the second layer.

In this case, preferably further at least a third coating station and a third drying station are provided.

Although the apparatus of the invention has a plurality of coating stations and drying stations, a travelling path of the base material can be substantially shortened comparing to an apparatus which has only a single coating station for applying and then drying the adhesive layer in a single coat.

BRIEF DESCRIPTION OF THE DRAWINGS

FIG. 2 is a view showing an example of manufacturing process of the hook and loop fastener of FIG. 1.

DETAILED DESCRIPTION OF PREFERRED EMBODIMENTS

Figure 1A:
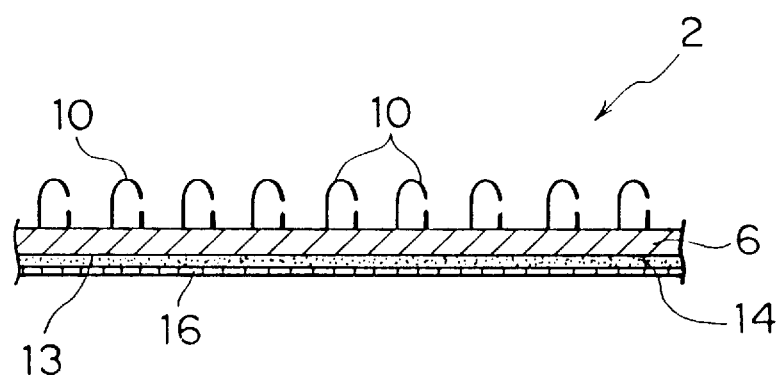
FIG. 1A and 1B are cross-sectional views schematically showing a typical embodiment of a hook part and a loop part of a hook and loop fastener having a self-adhesive function of the invention.
Figure 1B:
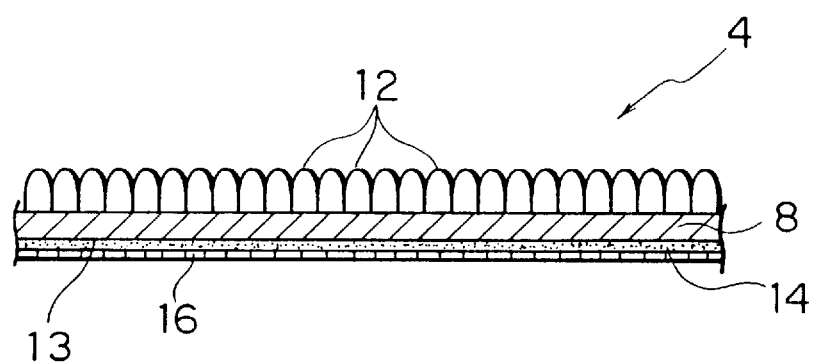

The invention will be further described by way of example with reference to the accompanying drawings. FIGS. 1A and 1B show respective parts of a hook and loop fastener of an embodiment of the invention. FIG. 2 shows an apparatus of an embodiment of the invention, and an example of successive processes for forming a self-adhesive part on a back surface of a base material of the hook and loop fastener. A hook member 2 and a loop member 4 of the hook and loop fastener shown in FIGS. 1A and 1B are schematically shown.

The hook member 2 and the loop member 4 are formed as a continuous strip of material which can be cut to the required size and shape. The base material 6, 8 depends on the particular application for the fastener and method of manufacture, as is well known in the art.

The typical hook member 2 comprises a flexible knit or woven nylon or polypropylene base material 6 which is about 10 cm wide. Nylon loops are knit or woven onto the material, and are then cut to form hooks 10. A typical loop member 4 has a textile base material 8 with a loop pile 12.

As will be described more fully below, a back surface 13 of the base material 6, 8 has a layer 14 of water based contact adhesive which is applied in a plurality of thin coats preferably three. A silicone paper 16 overlays the adhesive layer 14 to protect the adhesive layer 14 until the point of use.

Referring to FIG. 2, a construction of an apparatus for forming a self-adhesive layer of the hook and loop fastener of the invention will now be described. A continuous strip 20 of hook member 2 or loop member 4 is prepared in a supply station as being rolled on a roll 22. Feed rollers 24, buffer containers 26, 26, and a plurality of take-up rollers 28 are disposed in a strip travelling path between the supply station and a coating and drying stations. A part of the plurality of take-up rollers 28 are tension rollers which maintain a tension necessary for the travelling strip 20.

In FIG. 2, numeral 30 designates a first coating station for applying a thin layer of water based adhesive to the back surface 13 of the strip 20. The first coating station 30 comprises a first support roller 32 and a first delivery nozzle 34 of the adhesive. Downstream of the first coating station 30 along the strip 20, there disposed a first drying station 36, a second drying station 36', and a third drying station 36" in a single chamber. In this chamber, the first drying station 36 and the second drying station 36' and also the second drying station 36' and the third drying station 36" are spaced apart via two outside spaces of a desired size, with the travelling path of the strip 20 passing through all of them. A second coating station 30' and a third coating station 30" are disposed in the respective outside spaces. Likewise the first coating station 30, the second coating station 30' and the third coating station 30" respectively comprise a second and third support rollers 32', 32" and a second and third delivery nozzles 34', 34" of the adhesive.

The strip 20 turns over in the chamber as being guided by guide rollers, and is introduced to an outlet provided at a lower part of the chamber. A cooling station 37 is provided in the chamber near the outlet. The cooling station 37 cools the strip 20 on which a plurality times of (three times in this embodiment) coating and drying have been done, and discharges the strip 20 outside.

Outside the chamber and near the outlet, there provided a pair of joining rollers 39 for joining the strip 20 and a silicone paper 16 supplied from down side thereof in integrate them. Therefore, the silicone paper 16 in a form of a roll is provided below the chamber, and the silicone paper 16 is introduced to the joining rollers 39 via a guide roller. The strip 20 having a self-adhesive function and onto which the silicone paper 16 is laid integrally by the joining rollers 20 is wound onto a storage reel 40.

In continuous manufacturing of the hook and loop fasteners by the apparatus of this embodiment having the above described construction, the continuous strip 20 of the hook member 2 or the loop member 4 is supplied from the roll 22 to the buffer container 26 by the feed rollers 24. The rolled strip 20 is temporarily received in the buffer container 26 to mitigate an internal stress, whereupon the strip 20 is fed on the first support roller 32 of the first coating station 30 while a desired tention is maintained by the take-up rollers 28 such as a tension roller 28'. When the strip 20 passes on the support roller 32, the water based adhesive is applied on the back surface 13 of the strip 20 from the delivery nozzle 34 to form a thin layer. The strip 20 on which the first coating of the adhesive is done is introduced through the first drying station having a plurality of infrared heaters for drying the applied water based adhesive. Then, the strip 20 is fed as passing through the second and third coating stations 30', 30" and the second and third drying stations 36', 36" successively.

With the repetition of the plurality times of coating and drying processes, the processing time required to obtain a desired coating thickness is reduced and downsizing of the apparatus can be realized. Moreover, the productivity can be remarkably improved without giving any bad influence to the environment.

The strip 20 to which the water based adhesive is applied and is dried in each of the stations is then cooled by passing through the cooling station 37. Then, the strip 20 is joined by the joining rollers 39 as the adhesive layer 14 is integrally joined with the silicone paper 16 fed from a silicone paper roll 38. Thereafter, the strip 20 is continuously wound on the storage reel 40.

Typically, the adhesive is a dispersion of adherent copolymer in water, and such copolymer may typically disperse about 35% by weight of water. A suitable water based pressure sensitive adhesive is JOWATEX (trade mark) manufactured by Lobers und Frank GmbH & Co. KG of Detmold, Germany, such as JOWATEX 763 40, 763 60 and EP 70 4398. The thickness of the adhesive layer will depend on the base material, the adhesive and the intended use, but a thickness of 200 to 300 $g/m^2$ is typical, and this is applied in three coats of about 80 $g/m^2$.

The above described embodiment is an example of the invention, and it is obvious to the one skilled in the art that various modifications are possible as long as it is in the scope of the invention.

It is apparent from the foregoing description that, according to the construction of the adhesive part of the hook and loop fastener of the invention, since the water based adhesive, rather than a heat fusible adhesive, is used as a pressure sensitive adhesive material to be applied on the back surface of the base material, any adverse influence on environment can be avoided. Further, an influence of surroundings is much less than that of the heat fusible adhesive, and the adhesive function can be guaranteed in an ideal condition.

According to the method of forming the adhesive part of the invention, there is no need to worry about influence on the environment. And further, the method guarantees an efficient and excellent productivity without deteriorating its adhesive function, in spite of that the water based adhesive with which an efficient forming of layers is difficult is used. Especially, the adhesive is applied in the plurality of layers and dried after each application, an overall time required for drying can be much shorter than the conventional one-time application. With the adhesive forming apparatus of the invention, high productivity and minimization of the required space can be realized so that the foregoing method can be carried out efficiently and reliably.

What is claimed is:

1. An apparatus for forming a water based adhesive layer on a back surface of a continuous and flexible base material of a part of a hook and loop fastener having either hooks or loops disposed on a top surface of the base material, said apparatus comprising:

a first coating station for directly coating the back surface of the base material with a first layer of water based adhesive as the base material is continuously passed through the first coating station without coating the top surface of the base material with the adhesive, a first drying station for drying the first layer of adhesive, a second coating station for directly coating the dried first layer of adhesive with a second layer of the same adhesive as the base material is continuously passed through the second coating station without coating the top surface of the base material with the adhesive, a second drying station for drying the second layer of adhesive, and a conveying system for conveying the base material through the first coating station, the first drying station, the second coating station and the second drying station without engaging the first or second layers of adhesive.

2. Apparatus as claimed in claim 1 further comprising a third coating station for directly coating the dried second layer of adhesive with a third layer of the same adhesive and a third drying station for drying the third layer of adhesive.

3. The apparatus of claim 1 wherein the first coating station comprises a first nozzle for applying the first layer of adhesive on the back surface of the base material.

4. The apparatus of claim 1 wherein the second coating station comprises a second nozzle for applying the second layer of adhesive on the dried first layer of adhesive.

5. The apparatus of claim 2 wherein the third coating station comprises a third nozzle for applying the third layer of adhesive on the dried second layer of adhesive.

6. The apparatus of claim 2 wherein the apparatus further applies a layer of silicone paper on the third layer of adhesive, the apparatus further comprising the following stations downstream of the third drying station:
- a cooling station for cooling the layers of adhesive; and
- a paper application station for applying a layer of silicone paper to the third layer of adhesive.

7. An apparatus for coating a back side of a continuous strip of base material of a hook and loop fastener with an adhesive having either hooks or loops disposed on a top side of the strip, the apparatus comprising:
- a conveying means for continuously moving the strip of the base material through a plurality of stations of the apparatus, the plurality of stations comprising
- a first coating station comprising at least one nozzle for applying a first layer of liquid water based adhesive directly onto the back side of the strip and without applying adhesive to the top side of the strip,
- a first drying station for drying the first layer of adhesive thereby forming a dried first layer of adhesive,
- a second coating station comprising at least one nozzle for applying a second layer of the same liquid adhesive onto the dried first layer of adhesive,
- a second drying station for drying the second layer of adhesive thereby forming a dried second layer of adhesive, and
- wherein the conveying means conveys the base material through the first coating station, the first drying station, the second coating station and the second drying station without engaging the first or second layers of adhesive.

8. The apparatus of claim 7 further comprising:
- a third coating station comprising at least one nozzle for applying a third layer of the same liquid adhesive onto the dried second layer of adhesive,
- a third drying station for drying the third layer of adhesive thereby forming a dried third layer of adhesive.

9. The apparatus of claim 8 wherein the first, second and third coating stations each comprise a support roller disposed a spaced distance from the nozzle, the conveying means continuously transporting the strip between the nozzle and the support roller with the back side of the strip facing the nozzle.

10. The apparatus of claim 8 wherein the apparatus further applies a layer of silicone paper on the third layer of adhesive, the apparatus further comprising the following stations downstream of the third drying station:
- a cooling station for cooling the layers of adhesive; and
- a paper application station for applying a layer of silicone paper to the third layer of adhesive.

* * * * *